Figure 1:
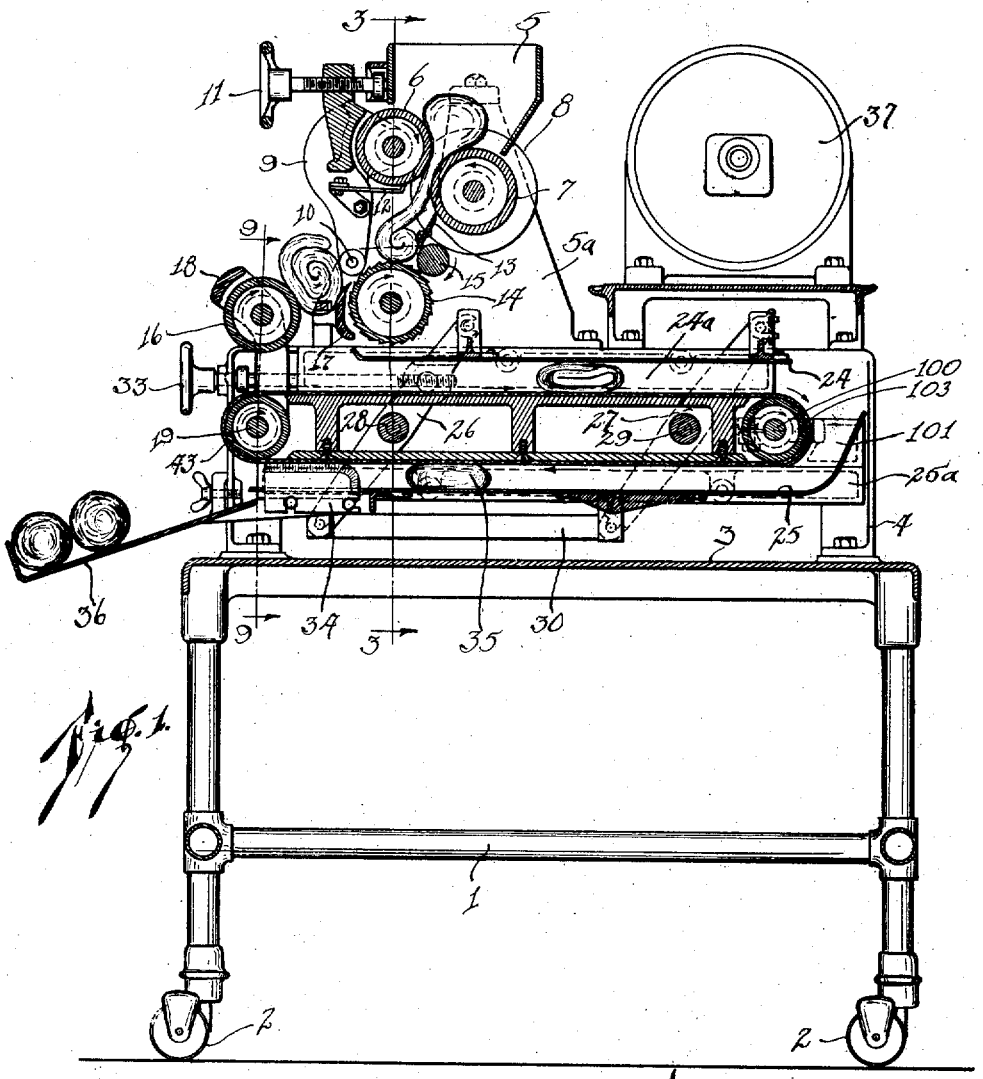

E. J. STERNBERG

July 26, 1932. DOUGH MOLDING DEVICE Re. 18,545

Original Filed Nov. 30, 1925 4 Sheets-Sheet 1

INVENTOR
E. J. Sternberg
BY Munn & Co.
ATTORNEY

E. J. STERNBERG

July 26, 1932. DOUGH MOLDING DEVICE Re. 18,545

Original Filed Nov. 30, 1925 4 Sheets-Sheet 2

INVENTOR
E. J. Sternberg
BY Munn & Co.
ATTORNEY

July 26, 1932.
E. J. STERNBERG
DOUGH MOLDING DEVICE
Original Filed Nov. 30, 1925
Re. 18,545
4 Sheets-Sheet 3
Fig. 6.
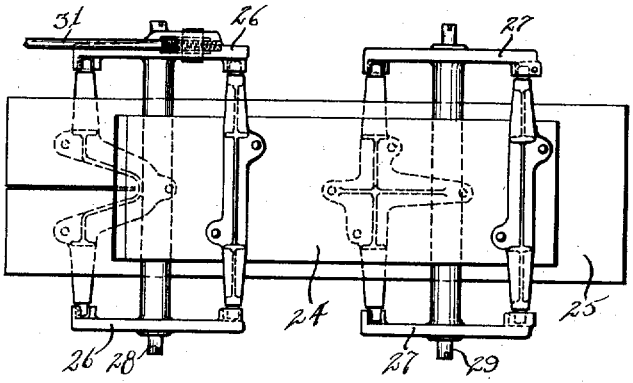
Fig. 8.
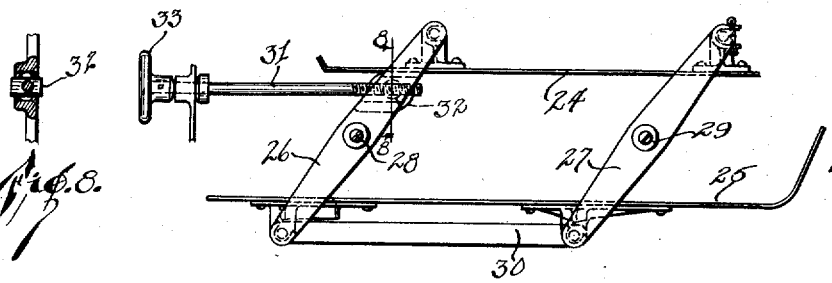
Fig. 7.
Fig. 3
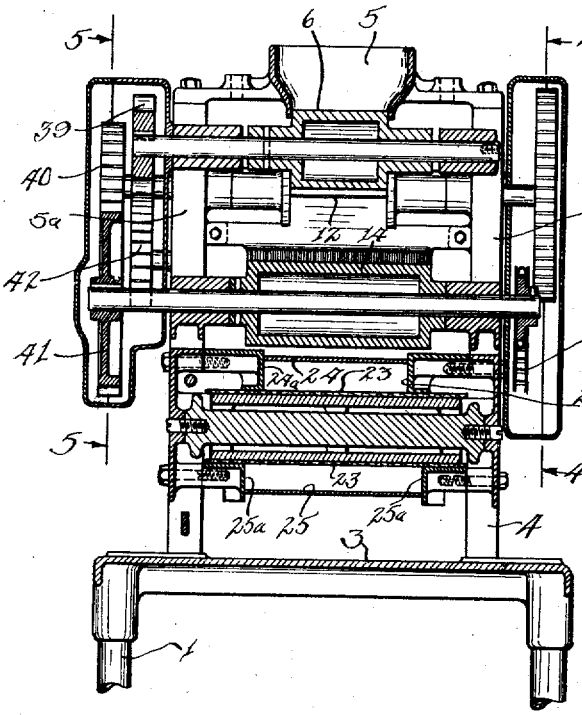
INVENTOR.
E. J. Sternberg
BY Munn & Co.
ATTORNEYS.

E. J. STERNBERG

July 26, 1932. DOUGH MOLDING DEVICE Re. 18,545

Original Filed Nov. 30, 1925 4 Sheets-Sheet 4

INVENTOR
E. J. Sternberg
BY Munn & Co.
ATTORNEY

Reissued July 26, 1932

Re. 18,545

UNITED STATES PATENT OFFICE

ERNST J. STERNBERG, OF CHICAGO, ILLINOIS, ASSIGNOR TO THOMSON MACHINE COMPANY, OF BELLEVILLE, NEW JERSEY, A CORPORATION OF NEW JERSEY

DOUGH-MOLDING DEVICE

Original No. 1,658,864, dated February 14, 1928, Serial No. 72,266, filed November 30, 1925. Application for reissue filed November 28, 1928. Serial No. 322,564.

My invention relates to improvements in dough molding devices, and it consists in the combinations, constructions, and arrangements herein described and claimed.

In the process of making bread, the various ingredients, such as flour, water, yeast, etc., are mixed in a mixing machine, the mixing process continuing until the dough is of the proper consistency. The dough is then dumped into troughs and allowed to stand until it is ready for succeeding operations.

When ready, the dough is divided into pieces, each piece constituting a loaf of bread. In large bakeries this dividing is done automatically in dividing machines, but in small bakeries, the dough is cut by hand with a knife. The cut dough is usually shaped into balls in such a manner that there is a skin formed on the surface of the ball which retains the gases arising in the dough. These rounded pieces of dough are allowed to stand for a few minutes before converting them into the shape necessary to drop them into the bread pans.

In shaping the dough for the bread pans, it is first flattened so as to form a strip or sheet of dough. This strip is then rolled into a long coil and in this operation, the layers of the coil are forced together so as to cause the layers to adhere to each other, thus preventing the roll of dough from unwinding. The ends of the loaf are also shaped so that when the bread is dropped into the pan, there is no evidence on the outer surface of the loaf that the dough has previously been wound up into a coil.

The principal object of the invention is to provide a machine to simulate the hand operation just described, this machine being constructed so as to first flatten the piece of dough, and then to coil this piece of dough into a roll. From this point the dough is pressed so as to cause the layers of the coil to adhere to each other. The machine is constructed so as to be operated by one man, and to this end I have disposed the intake hopper and discharge plate on the same side of the machine. This arrangement permits the machine to be placed against the wall of the bakery.

A further object of my invention is to provide a machine which is portable, thus permitting the device to be moved from place to place.

A further object of my invention is to provide a machine which has novel means for molding the dough after the strip of dough has been wound into a coil.

Other objects and advantages will appear in the following specification, and the novel features of the invention will be particularly pointed out in the appended claims.

Figure 9:
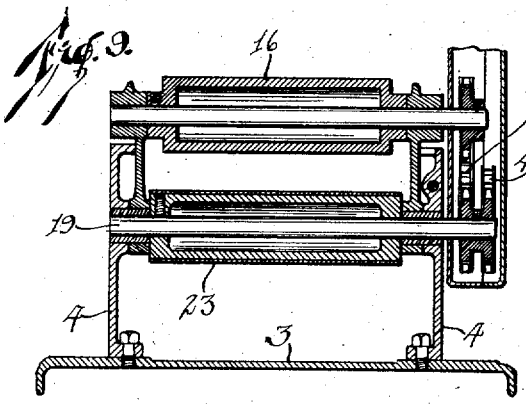
Figure 10:
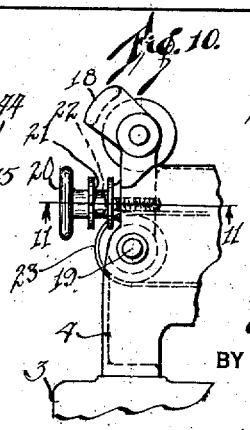
Figure 11:
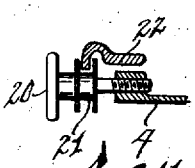
Figure 2:
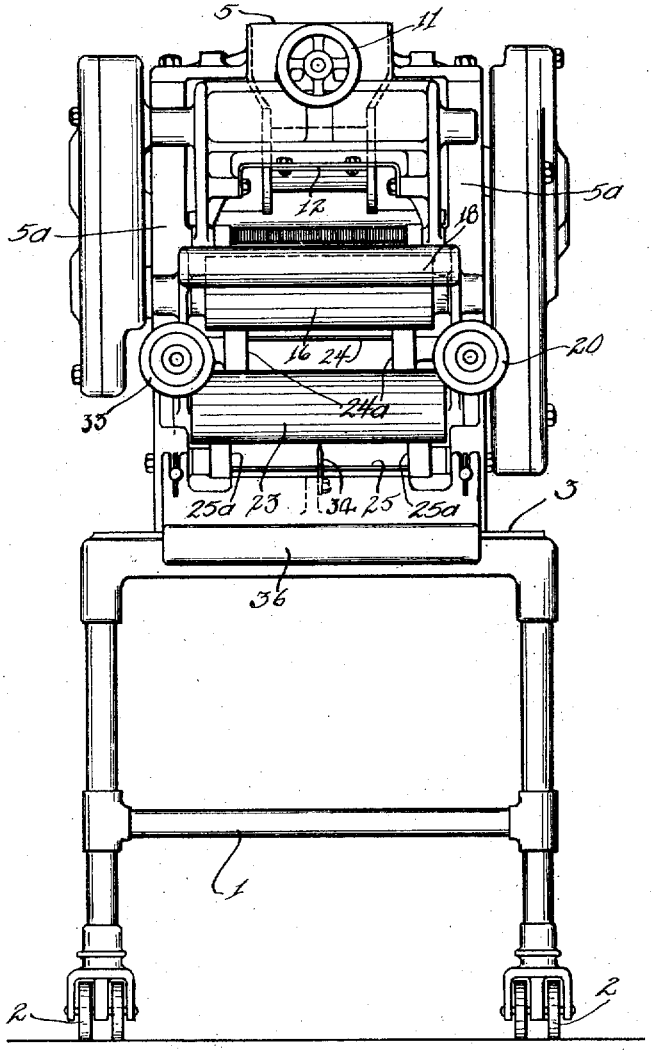
Figure 12:
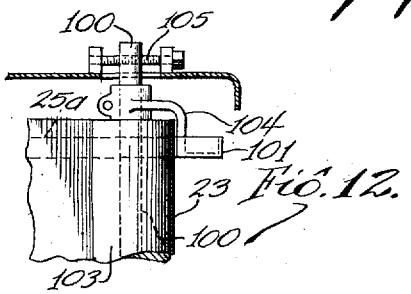
Figure 4:
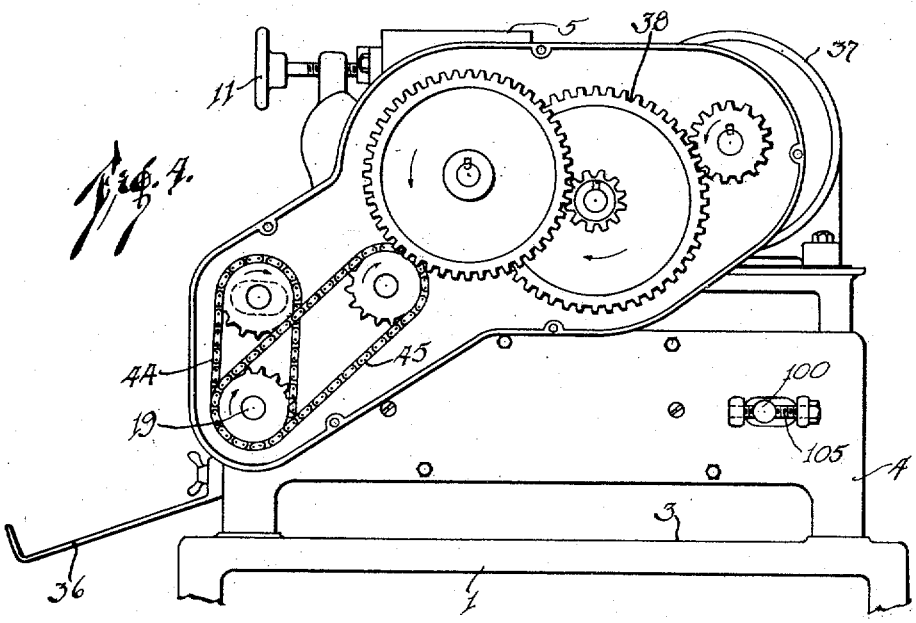
Figure 5:
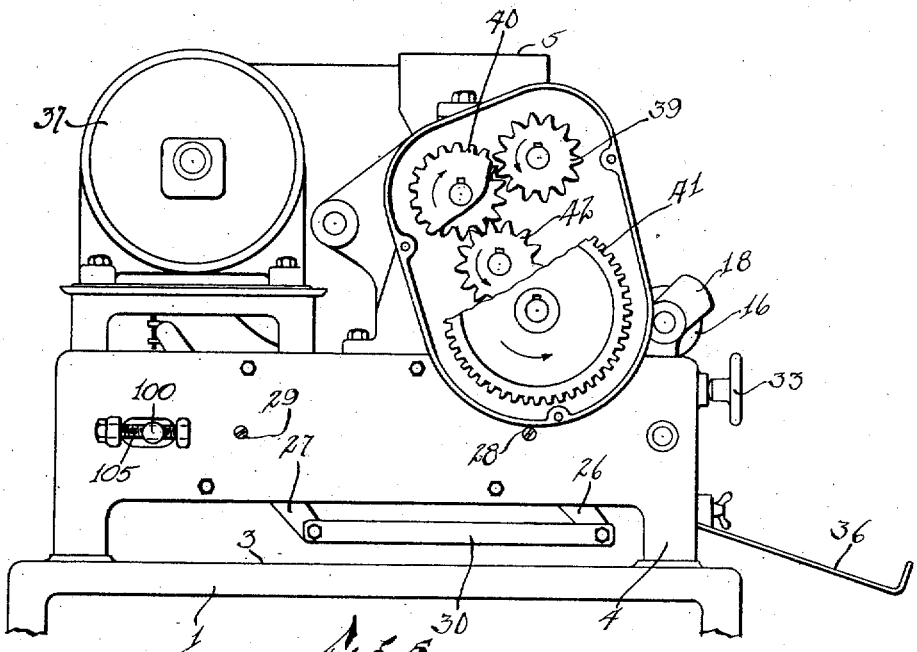

My invention is illustrated in the accompanying drawings, forming part of this application, in which Figure 1 is a longitudinal section through the device, Figure 2 is an end elevation of the device, Figure 3 is a section along the line 3—3 of Figure 1, Figure 4 is a section along the line 4—4 of Figure 3, Figure 5 is a section along the line 5—5 of Figure 3, Figure 6 is a plan view of a portion of the device, Figure 7 is a side elevation of Figure 6, Figure 8 is a section along the line 8—8 of Figure 7, Figure 9 is a section along the line 9—9 of Figure 1, Figure 10 is a side elevation of a portion of the device, Figure 11 is a section along the line 11—11 of Figure 10, and Figure 12 is a sectional detail view showing the means by which the belt may be adjusted.

In carrying out my invention, I provide a support or base 1 that is mounted upon rollers 2 to permit it to be moved from place to place. The base has a top 3, and Figures 1 and 3 clearly show how the top 3 supports the molding device.

The device itself comprises a frame 4 made up of various parts now to be described. At the top of the frame, I dispose a dough-receiving hopper 5 between two casings 5ª and this hopper conveys the dough to two sheeting rollers 6 and 7, these rollers being spaced a predetermined distance apart, and being rotated toward each other so as to cause the dough to be flattened, as shown in Figure 1, as the dough is forced between the two rollers. The rollers revolve in the direction indicated by the arrows, and the means for rotating the rollers will be hereinafter described.

The roller 6 is movable toward and away from the roller 7 and is received by the flanges 8 carried by the ends of the roller 7, see Figure 1. The means for moving the roller 6 consists of a frame 9 pivotally secured to the casting 4 at 10 and carrying the roller 6. A thumb screw 11 moves the roller 6 toward or away from the roller 7 and holds the roller in adjusted position. Scraper knives 12 and 13 keep the rollers 6 and 7 cleaned during the operation of the device, and guide the dough sheet in the proper direction.

The strip of dough, after passing between the rollers 6 and 7, drops down upon a serrated roller 14. This roller is rotated in the direction indicated by the arrow shown in Figure 1, and wraps the strip of dough into a coil. An idler roller 15 prevents the dough from being carried around with the roller 14. After the entire piece of dough has been wrapped up into a coil, the weight of the coiled loaf will cause it to fall down between a control roller 16 and an apron 17. These two parts of the machine prevent the roll from becoming unwound as it passes from the roller 14 to the conveying trough hereinafter described.

The roller 16 is adjustable toward and away from the apron 17, and this is clearly shown in Figures 10 and 11. The roller 16 is carried by a U-shaped arm 18, and the arm in turn is pivotally secured to the casting 4 at 19. A hand screw 20 is carried by the casting 4, see Figure 11, and is provided with an annular groove 21 for guiding a finger 22. The finger 22 is carried by the arm 18 and therefore moves the roller 16 toward or away from the apron 17 when the hand screw 20 is actuated.

The dough, after passing between the roller 16 and the apron 17, drops down upon a conveyor belt 23. This conveyor belt cooperates with an adjustable plate 24, which, together with the side walls 24ª, compress the dough to cause the layers to adhere to each other and also aids in molding the dough into a loaf. The conveyor belt 23 travels in the direction indicated by the arrow shown in Figure 1, and the roll of dough is carried thereby and is compressed slightly by coming into contact with the under surface of the plate 24. After the dough leaves this passageway defined by the conveyor belt 23, the plate 24, and the walls 24ª, it drops down into a second passageway defined by the conveyor belt 23, the upper surface of the plate 25, and the side walls 25ª. In this way, I make use of the entire length of conveyor belt, and furthermore, I provide a machine in which the discharge end is disposed at the same end as the hopper. The lower side walls 25ª may be spaced further apart than the upper side walls 24ª as indicated in the drawings. By using two spaces of different widths the top side may be used for molding and kneading of the dough, and the lower side, being wider, permits the loaf to be extended as it passes through the lower box. The side walls are employed on the lower stretch to limit the extension for discharge of uniform loaves, and also to continue the molding process as extension takes place. The lower presser plate 25 is preferably so spaced from the belt that the kneading and molding action is combined with the extension process.

In order to accomplish the above objects I prefer to maintain approximate equality in the cross-sectional areas of the two mold boxes. The top narrower mold box therefore requires presser plate 24 to be further spaced from the belt than presser plate 25.

The plates 24 and 25 are adjustable so as to compress the dough to any desired amount. Accordingly, I provide means for adjusting the lower and upper presser plates by unequal amounts to maintain a proper relation in the cross-sectional areas of the two mold boxes. Greater motion in adjustment is desired in the narrower box. The means for accomplishing this is shown in Figures 6, 7 and 8. The plates 24 and 25 are connected to each other by means of parallel arms 26 and 27. The arms are pivotally connected to the casting 4 by means of shafts 28 and 29, and the arms are also connected to each other by means of a link 30. The pivot centers 28 and 29 are spaced nearer the ends carrying the lower presser plate 25 so that the relative radii of the arcs through which the plates swing are inversely related to the widths of the mold boxes. This gives the plates adjustment motions for different distances substantially as required. A screw shaft 31 is connected to the arm 26 by means of a pin 32, see Figure 8. The screw shaft 31 is actuated by a handle 33.

At the discharge end of the machine, I dispose a knife 34 for severing the molded loaf 35 into two equal parts. These parts are received by a discharge plate 36.

The means for actuating the various rollers consists of a motor 37. This motor is connected to a train of gears 38 and the gears in turn actuate the roller 7. The gears are shown in Figure 4. In Figure 5, I show the gears 39 disposed in the opposite side of the machine, these gears being connected to the rollers 6 and 7 and the teeth being of a sufficient depth to permit the rollers to be moved toward and away from each other, and yet be operatively connected to each other. The roller 14 is connected to the rollers 6 and 7 by means of gears 40 and 41, while the roller 15 is connected by means of a gear 42. In Figure 4, I show how the rollers 16 and 43 are operatively connected to each other and to the train of gears 38. The connecting means consists of roller chains 44 and 45 and sprocket gears. The roller 43 actuates the conveyor belt 23.

In Figures 1 and 12, I have shown means whereby any slack in the belt may be taken up, and at the same time the dough is prevented from falling onto the lower walls 25ª. The shaft 100 has secured to it a block or plate 101 which is disposed above and slides on the lower wall 25ª, and really forms an extension of the lower wall. The extension 101 has an edge which is spaced slightly from the belt 23 on the roller 103 so as to clear the belt, but to be close enough to it to prevent dough from being squeezed between the belt and the extension. An arm 104 passes around the end of the roller 103 and is secured rigidly to the shaft 100. The shaft 100, together with the roller 103, is adjustable horizontally by means of an adjusting bolt 105. When the dough passes off from the upper portion of the belt 23, it is prevented by these extensions 101 from falling on the lower walls 25ª. When, however, it is desired to vary the tension of the belt, it may be done by means of the adjusting bolts 105 which move the roller and the extension to the same distance so that the space between these parts is always constant.

From the foregoing description of the various parts of the device, the operation thereof may be readily understood. Pieces of dough of definite weight are fed into the hopper 5 one at a time and each piece is flattened and coiled in the manner described, and then passed on to the endless belt. Here it is moved forward while still in its coiled condition, the layers however tending to unite under the pressure and movement, as stated. When the coil reaches the end of the belt, it drops down into the lower trough and is carried rearwardly, being cut by the knife and then dropped onto the discharge plate 36. In the molding operation, the side walls, as stated, play an important part to cause the adherence of the layers so as to render the texture of the molded roll uniform. One might suppose that the ends of the molded loaf would be flat, but such is not the case, for after the pressure is removed from the ends, these ends tend to round out so that the loaf has rounded ends and not flat ends. It will be understood that after the loaf is ejected onto the discharge plate 36, the layers have so adhered that the loaf will not unwind, but is in a condition for immediate baking in an oven.

One advantage of this device is that it is continuous in operation and may be readily operated by one man due to the fact that the hopper 5 and the discharge plate 36 are disposed on the same side of the machine. The rollers are adjustable so as to form coils of various sizes and different weights. By making use of a single endless belt to pass the loaf forward in one direction and rearwardly in the opposite direction, it obviates the necessity of a plurality of belts, and it also provides a molding machine which takes up comparatively little room as compared with the length of travel of the dough which is being molded.

I claim:

1. In a device of the type described, a dough-compressing and shaping means comprising an endless conveyor belt, dough-compressing means disposed above and below said conveyor belt for holding pieces of dough against said conveyor belt during the entire length of the conveyor belt, rollers for carrying said conveyor belt, means for moving said rollers to take up the slack in the conveyor belt, and means for guiding the dough from the upper dough compressing means to the lower dough compressing means, said guiding means being movable with said movable roller.

2. In a dough molding device, an endless belt having the major portions thereof disposed in horizontal planes, an adjustable plate disposed above the upper portion of the belt, an adjustable plate disposed below the lower portion of the belt, means for feeding a coil of dough to the upper portion of the belt, means for causing the travel of the belt, thereby bringing the dough into contact with the adjacent plate, and means for guiding the dough into the space between the lower portion of the belt and the lower plate, and means for simultaneously adjusting the positions of the adjustable plates.

3. In a dough molding device, an endless belt for conveying dough, a pair of pivoted arms, plates carried at the ends of said arms, one plate being disposed above the belt in parallelism therewith, the other plate being disposed below the belt in parallelism therewith, and means for moving said pivoted arms to vary the position of the plates with respect to the belt.

4. In a dough molding machine, an endless belt, rollers for actuating the belt, rigid means disposed between the loop of the belt for reenforcing the latter, upper and lower movable presser plates disposed parallel with the belt on opposite sides thereof, side walls extending from the sides of said presser plates to the face of the belt, means for delivering dough between the upper presser plate and the belt, means for conveying the dough from the upper portion of the belt to the lower presser plate, and means for simultaneously moving the presser plates with respect to the side walls.

5. In a dough molding device, an endless belt, rollers for said belt at the ends thereof, said rollers being mounted on horizontal axles, an upper presser plate above the upper portion of the belt, a lower presser plate below the lower portion of the belt, means for feeding dough between the upper presser plate and the belt, slidable means for moving the axles of one of said rollers away from the other roller to take up the slack in the belt, means for conveying the dough from the upper portion of the belt to the space between the lower presser plate and the lower portion of the belt, and an extension disposed adjacent to the movable roller to guide the dough, said extension being movable with the roller and being spaced at a uniform distance from the roller in any of its adjusted positions.

6. In a dough-molding device, an endless belt having the major portions thereof disposed in a horizontal plane, a plate disposed above the upper portion of the belt, a plate disposed below the lower portion of the belt a distance less than that between the upper portion of the belt and the corresponding plate, means for feeding a coil of dough to the upper portion of the belt, means for causing the travel of the belt, thereby bringing the dough into contact with the adjacent plate, means for guiding the dough into the space between the lower portion of the belt and the lower plate, and means for simultaneously adjusting both plates with respect to the adjacent portions of the belt to a proportional extent whereby the lower plate is maintained closer to the belt than is the upper plate.

7. In a dough-molding device, an endless belt, an upper presser plate above said endless belt, a lower presser plate below said endless belt, means for spacing said presser plates unequal distances from the belt, and means for simultaneously moving said presser plates toward and away from said belt maintaining said unequal spacing.

8. In a dough molding machine of the character described, in combination, a belt having two approximately horizontal stretches passing over rollers and supported on their adjacent sides, means causing said belt to travel; a mold box having a presser plate and side walls over the face of one stretch of the belt, a wider mold box at the other stretch of the belt having similarly a presser plate and side walls over the face of the belt, means to feed a roll of dough to the first mold box, an extension of the lower presser plate in the direction of the belt around one roller to receive the dough discharged from said first mold box, and means extending the side walls of the lower mold box at least as far as said extension of the presser plate, whereby to form therewith a guiding and receiving means for the dough from the first mold box.

In testimony whereof I have subscribed my name.

ERNST J. STERNBERG.